US012300187B2

(12) United States Patent
Guan et al.

(10) Patent No.: US 12,300,187 B2
(45) Date of Patent: May 13, 2025

(54) BACKLIGHT BRIGHTNESS ADJUSTMENT METHOD AND DEVICE FOR ADJUSTING BRIGHTNESS AT BACKLIGHT SPLICING POSITIONS

(71) Applicant: BOE Technology Group Co., Ltd., Beijing (CN)

(72) Inventors: Enhui Guan, Beijing (CN); Xianzhen Li, Beijing (CN); Tianyue Zhao, Beijing (CN); Xinxin Mu, Beijing (CN); Youxiang Xia, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/282,548

(22) PCT Filed: Jan. 10, 2023

(86) PCT No.: PCT/CN2023/071491

§ 371 (c)(1),
(2) Date: Sep. 18, 2023

(87) PCT Pub. No.: WO2023/143036

PCT Pub. Date: Aug. 3, 2023

(65) Prior Publication Data

US 2024/0177681 A1 May 30, 2024

(30) Foreign Application Priority Data

Jan. 30, 2022 (CN) ......................... 202210113531.6

(51) Int. Cl.
*G09G 3/34* (2006.01)

(52) U.S. Cl.
CPC ... *G09G 3/3426* (2013.01); *G09G 2320/0626* (2013.01); *G09G 2360/16* (2013.01)

(58) Field of Classification Search
CPC ...... G09G 3/34; G09G 3/3406; G09G 3/3413; G09G 3/342; G09G 3/3426; G09G 3/3473;
(Continued)

(56) References Cited

U.S. PATENT DOCUMENTS 8,957,880 B2 * 2/2015 Tanaka .................. G09G 3/342
362/615
2006/0146530 A1 7/2006 Park et al.
(Continued)

FOREIGN PATENT DOCUMENTS

CN 102691922 A 9/2012
CN 103017040 A 4/2013
(Continued)

OTHER PUBLICATIONS

International Search Report for PCT/CN2023/071491 Mailed Apr. 6, 2023.
(Continued)

*Primary Examiner* — Ke Xiao
*Assistant Examiner* — Nelson Lam
(74) *Attorney, Agent, or Firm* — Ling Wu; Stephen Yang; Ling and Yang Intellectual Property

(57) ABSTRACT

A backlight brightness adjustment method, device, and system, and a storage medium. The adjustment method comprises: calculating a light mixing distance of a backlight module and a horizontal spacing and a vertical spacing between a plurality of lamp panels; calculating a first brightness value according to the horizontal spacing and the light mixing distance, and calculating a second brightness value according to the vertical spacing and the light mixing distance; and adjusting the brightness at splicing positions of the plurality of lamp panels according to the first brightness value and/or the second brightness value.

17 Claims, 5 Drawing Sheets

(58) Field of Classification Search
CPC .................... G09G 3/36; G09G 3/3611; G09G 2320/0626; G09G 2320/0633; G09G 2320/064; G09G 2320/0646; G09G 2320/0653
USPC .................................................... 345/87–104
See application file for complete search history.

(56) References Cited

U.S. PATENT DOCUMENTS

| | | | | |
|---|---|---|---|---|
| 2010/0045694 | A1* | 2/2010 | Tanaka | G09G 3/342 345/589 |
| 2010/0182346 | A1* | 7/2010 | Sano | G09G 3/3413 345/690 |
| 2011/0292018 | A1* | 12/2011 | Kubota | G09G 3/3426 345/102 |
| 2012/0274669 | A1* | 11/2012 | Neal | G09G 3/342 345/102 |
| 2019/0353961 | A1 | 11/2019 | Ji et al. | |
| 2020/0342819 | A1* | 10/2020 | Cheng | G09G 3/342 |
| 2022/0252939 | A1 | 8/2022 | Wang et al. | |
| 2022/0365395 | A1 | 11/2022 | Zhang et al. | |
| 2023/0037624 | A1* | 2/2023 | He | G09G 3/3426 |

FOREIGN PATENT DOCUMENTS

| | | | |
|---|---|---|---|
| CN | 103047589 | A | 4/2013 |
| CN | 103629603 | A | 3/2014 |
| CN | 104848094 | A | 8/2015 |
| CN | 108665866 | A | 10/2018 |
| CN | 109637459 | A | 4/2019 |
| CN | 110133914 | A | 8/2019 |
| CN | 110187563 | A | 8/2019 |
| CN | 111128081 | A | 5/2020 |
| CN | 111915982 | A | 11/2020 |
| CN | 212341647 | U | 1/2021 |
| CN | 212460264 | U | 2/2021 |
| CN | 113160757 | A | 7/2021 |
| CN | 113820885 | A | 12/2021 |
| CN | 114420062 | A | 4/2022 |
| JP | 2012043671 | A | 3/2012 |
| WO | 2017036206 | A1 | 3/2017 |

OTHER PUBLICATIONS

Office Action dated Feb. 8, 2023 for Chinese Patent Application No. 202210113531.6 and English Translation.

* cited by examiner

BACKLIGHT BRIGHTNESS ADJUSTMENT METHOD AND DEVICE FOR ADJUSTING BRIGHTNESS AT BACKLIGHT SPLICING POSITIONS

CROSS-REFERENCE TO RELATED APPLICATION

The present application is a U.S. National Phase Entry of International Application PCT/CN2023/071491 having an international filing date of Jan. 10, 2023 claims priority of Chinese patent application No. 202210113531.6, filed to the CNIPA on Jan. 30, 2022, and entitled "Backlight Brightness Adjustment Method, Device, and System, and Storage Medium", the contents of which should be interpreted as being incorporated herein by reference.

TECHNICAL FIELD

The embodiments of the present disclosure relates to, but is not limited to, the technical field of displays, and particularly to a method, a device, and a system for adjusting backlight brightness, and a storage medium.

BACKGROUND

MiniLight Emitting Diode (Mini LED for short) display devices are increasingly used in the field of high-performance display because of their features such as small size, thin and light products, low power consumption, good dynamic contrast, high brightness, good display effect, no radiation and relatively low manufacturing cost. Mini LED backlight technology utilizes a composition of tens of thousands of ultra-small sized LED lamps, which can make a dimming partition more detailed, have higher contrast, shorten a light mixing distance and reduce a thickness of the whole machine.

SUMMARY

The following is a summary of subject matter described herein in detail. The summary is not intended to limit the protection scope of claims.

In a first aspect, an embodiment of the present disclosure provides a method for adjusting backlight brightness, which is used for adjust brightness at splicing positions of lamp panels in a backlight module. The backlight module includes multiple lamp panels arranged in an array, and the multiple lamp panels arranged in the array are disposed on the backlight module in a splicing manner. The method includes the following acts:

calculating a light mixing distance of the backlight module and a horizontal spacing and a vertical spacing between multiple lamp panels;

calculating a first brightness value according to the horizontal spacing and the light mixing distance, and calculating a second brightness value according to the vertical spacing and the light mixing distance; and adjusting brightness at splicing positions of the multiple lamp panels according to at least one of the first brightness value and the second brightness value.

In an exemplary implementation, the backlight module further includes a light guide plate, and calculating the light mixing distance of the backlight module includes:

acquiring multiple light mixing distances between the multiple lamp panels and the light guide plates; and calculating an average value of the multiple light mixing distances to obtain the light mixing distance.

In an exemplary implementation, the acquiring the multiple light mixing distances between the multiple lamp panels and the light guide plate includes acquiring a first light mixing distance and a second light mixing distance between lamp panels located at two ends of the backlight module in a first direction or a second direction and the light guide plate; and the light mixing distance is obtained by calculating the average value of the multiple light mixing distances, and is calculated by the following formula:

$$h = \frac{1}{2}(h_1 + h_2),$$

where h is the light mixing distance, $h_1$ is the first light mixing distance, and $h_2$ is the second light mixing distance.

In an exemplary implementation, calculating the horizontal spacing between the multiple lamp panels includes:

acquiring a length of the backlight module in the first direction, a length of a lamp panel in the first direction, and multiple horizontal distances between lamp panels located at two ends in the first direction among the multiple lamp panels and edges of the backlight module;

the horizontal spacing is calculated according to the multiple horizontal distances, the length of the backlight module in the first direction, and the length of the lamp panel in the first direction.

In an exemplary implementation, acquiring the multiple horizontal distances between the lamp panels located at the two ends in the first direction among the multiple lamp panels and the edges of the backlight module includes: acquiring a first horizontal distance and a second horizontal distance between two ends of a first row of lamp panels arranged in the array in the first direction among the multiple lamp panels and edges of the backlight module, respectively, and acquiring a third horizontal distance and a fourth horizontal distance between two ends of a last row of lamp panels arranged in the array in the first direction among the multiple lamp panels and edges of the backlight module, respectively;

the horizontal spacing is calculated according to the multiple horizontal distances, the length of the backlight module in the first direction, and the length of the lamp panel in the first direction by the following formula:

$$\Delta x = \frac{1}{2}\left(\frac{Lx - (x_1 + x_2 + na)}{n - 1} + \frac{Lx - (x_3 + x_4 + na)}{n - 1}\right),$$

where Δx is the horizontal spacing between the multiple lamp panels, Lx is the length of the backlight module in the first direction, $x_1$ is the first horizontal distance, $x_2$ is the second horizontal distance, $x_3$ is the third horizontal distance, $x_4$ is the fourth horizontal distance, n is a quantity of columns of the multiple lamp panels arranged in the array, and a is the length of the lamp panel in the first direction.

In an exemplary implementation, acquiring the multiple horizontal distances between the lamp panels located at the two ends in the first direction among the multiple lamp panels and the edges of the backlight module includes: acquiring multiple first horizontal distances and multiple second horizontal distances between the two ends of lamp panels arranged in the array in the first direction and edges of the backlight module, respectively, calculating an average value of the multiple first horizontal distances to obtain the average value of the first horizontal distances, and calculating an average value of the multiple second horizontal distances to obtain the average value of the second horizontal distances;

the horizontal spacing is calculated according to the multiple horizontal distances, the length of the backlight module in the first direction, and the length of the lamp panel in the first direction by the following formula:

$$\Delta x = \frac{Lx - (\overline{x}_1 + \overline{x}_2 + na)}{n-1},$$

where Δx is the horizontal spacing between the multiple lamp panels, Lx is the length of the backlight module in the first direction, $\overline{x_1}$ is the average value of the first horizontal distances, $\overline{x_2}$ is the average value of the second horizontal distances, n is a quantity of columns of the multiple lamp panels arranged in the array, and a is the length of the lamp panels in the first direction.

In an exemplary implementation, the first brightness value calculated from the horizontal spacing and the light mixing distance is obtained by the following formula:

$$H_x = \frac{k_1 \times \Delta x}{h},$$

among them, $H_x$ is the first brightness value, $k_1$ is a first brightness reference value, and h is the light mixing distance.

In an exemplary implementation, calculating the vertical spacing between the multiple lamp panels includes:

acquiring a length of the backlight module in the second direction, a length of a lamp panel in the second direction, and multiple vertical distances between the lamp panels located at two ends in the second direction among the multiple lamp panels and the edges of the backlight module; and the vertical spacing is calculated according to the multiple vertical distances, the length of the backlight module in the second direction, and the length of the lamp panel in the second direction.

In an exemplary implementation, the acquiring the multiple vertical distances between the lamp panels located at the two ends in the second direction among the multiple lamp panels and edges of the backlight module includes: acquiring a first vertical distance and a second vertical distance between two ends of a first column of lamp panels arranged in the array in the second direction among the multiple lamp panels and edges of the backlight module, respectively, and acquiring a third vertical distance and a fourth vertical distance between two ends of a last column of lamp panels arranged in the array in the second direction among the multiple lamp panels and edges of the backlight module, respectively;

the vertical spacing is calculated according to the multiple vertical distances, the length of the backlight module in the second direction, and the length of the lamp panel in the second direction by the following formula:

$$\Delta y = \frac{1}{2}\left(\frac{Ly - (y_1 + y_2 + nb)}{n-1} + \frac{Ly - (y_3 + y_4 + nb)}{n-1}\right),$$

where Δy is the vertical spacing between the multiple lamp panels, Ly is the length of the backlight module in the second direction, $y_1$ is the first vertical distance, $y_2$ is the second vertical distance, $y_3$ is the third vertical distance, $y_4$ is the fourth vertical distance, n is a quantity of rows of the multiple lamp panels arranged in the array, and b is the length of the lamp panel in the second direction.

In an exemplary implementation, acquiring the multiple vertical distances between the lamp panels located at the two ends in the second direction among the multiple lamp panels and the edges of the backlight module includes: acquiring multiple first vertical distances and multiple second vertical distances between two ends of lamp panels arranged in the array in the second direction and edges of the backlight module, respectively, calculating an average value of the multiple first vertical distances to obtain an average value of the first vertical distances, and calculating an average value of the multiple second vertical distances to obtain an average value of the second vertical distances;

the vertical spacing is calculated according to the multiple vertical distances, the length of the backlight module in the second direction, and the length of the lamp panel in the second direction by the following formula:

$$\Delta y = \frac{Ly - (\overline{y}_1 + \overline{y}_2 + nb)}{n-1},$$

where Δy is the vertical spacing between the multiple lamp panels, Ly is the length of the backlight module in the second direction, $\overline{y_1}$ is the average value of the first vertical distances, $\overline{y_2}$ is the average value of the second vertical distances, n is a quantity of rows of the multiple lamp panels arranged in the array, and b is the length of the lamp panel in the second direction.

In an exemplary implementation, the second brightness value calculated from the vertical spacing and the light mixing distance is obtained by the following formula:

$$H_y = \frac{k_2 \times \Delta y}{h},$$

among them, $H_y$ is the second brightness value, $k_2$ is a second brightness reference value, and h is the light mixing distance.

In an exemplary implementation, adjusting the brightness at the splicing positions of the multiple lamp panels according to the first brightness value includes: adjusting brightness of adjacent lamp panels at a first splicing position in the first direction according to the first brightness value and the first preset brightness value; and adjusting the brightness at the splicing positions of the multiple lamp panels according to the second brightness value includes: adjusting brightness of adjacent lamp panels at a second splicing position in the second direction according to the second brightness value and the second preset brightness value.

In an exemplary implementation, adjusting the brightness at the splicing positions of the multiple lamp panels according to the first brightness value and the second brightness value includes:

calculating a third brightness value according to the first brightness value and the second brightness value; and adjusting brightness of the multiple lamp panels at a third splicing position according to the third brightness value.

In an exemplary implementation, calculating the third brightness value according to the first brightness value and the second brightness value includes: calculating an average value of the first brightness value and the second brightness value to obtain the third brightness value; and adjusting the brightness of the multiple lamp panels at the third splicing position according to the third brightness value includes: adjusting brightness of the multiple lamp panels at the third splicing position according to the third brightness value and a third preset brightness value.

In an exemplary implementation, adjusting the brightness at the multiple splicing positions of lamp panels according to at least one of the first brightness value and the second brightness value includes:

adjusting brightness of a backlight source at splicing positions of multiple lamp panels on the backlight module according to at least one of the first brightness value and the second brightness value.

In a second aspect, an embodiment of the present disclosure further provides a system for adjusting backlight brightness, which is configured to adjust brightness at splicing positions of lamp panels in a backlight module, the backlight module includes multiple lamp panels arranged in an array, and the multiple lamp panels arranged in the array are disposed on the backlight module in a splicing manner, and the adjustment system includes:

a distance calculation module configured to calculate a light mixing distance and a horizontal distance and a vertical distance between the multiple lamp panels;

a brightness value calculation module configured to calculate a first brightness value according to the horizontal spacing and the light mixing distance and calculate a second brightness value according to the vertical spacing and the light mixing distance; and an adjustment module configured to adjust brightness at the splicing positions of multiple lamp panels according to at least one of the first brightness value and the second brightness value.

In a third aspect, an embodiment of the present disclosure further provides a device for adjusting backlight brightness, which is configured to adjust brightness at splicing positions of lamp panels in a backlight module, the backlight module includes multiple lamp panels arranged in an array, and the multiple lamp panels arranged in the array are disposed on the backlight module in a splicing manner, the adjustment system includes a memory, a processor, and a computer program stored in the memory and executable on the processor to execute:

calculating a light mixing distance and a horizontal spacing and a vertical spacing between multiple lamp panels;

calculating a first brightness value according to the horizontal spacing and the light mixing distance, and calculating a second brightness value according to the vertical spacing and the light mixing distance; and adjusting brightness at the splicing positions of the multiple lamp panels according to at least one of the first brightness value and the second brightness value.

In a fourth aspect, an embodiment of the present disclosure further provides a non-transitory computer-readable storage medium, which is configured to store computer program instructions, and when the computer program instructions are executed, the method for adjusting backlight brightness according to any one of the above embodiments can be implemented.

Other aspects may be understood upon reading and understanding the drawings and detailed description.

BRIEF DESCRIPTION OF DRAWINGS

Accompanying drawings are intended to provide a further understanding of technical solutions of the present disclosure and form a part of the specification, and are used to explain the technical solutions of the present disclosure together with embodiments of the present disclosure, and do not form limitations on the technical solutions of the present disclosure. The shape and size of each component in the drawings do not reflect an actual scale, and are only intended to schematically illustrate the contents of the present disclosure.

DETAILED DESCRIPTION

Figure 1:
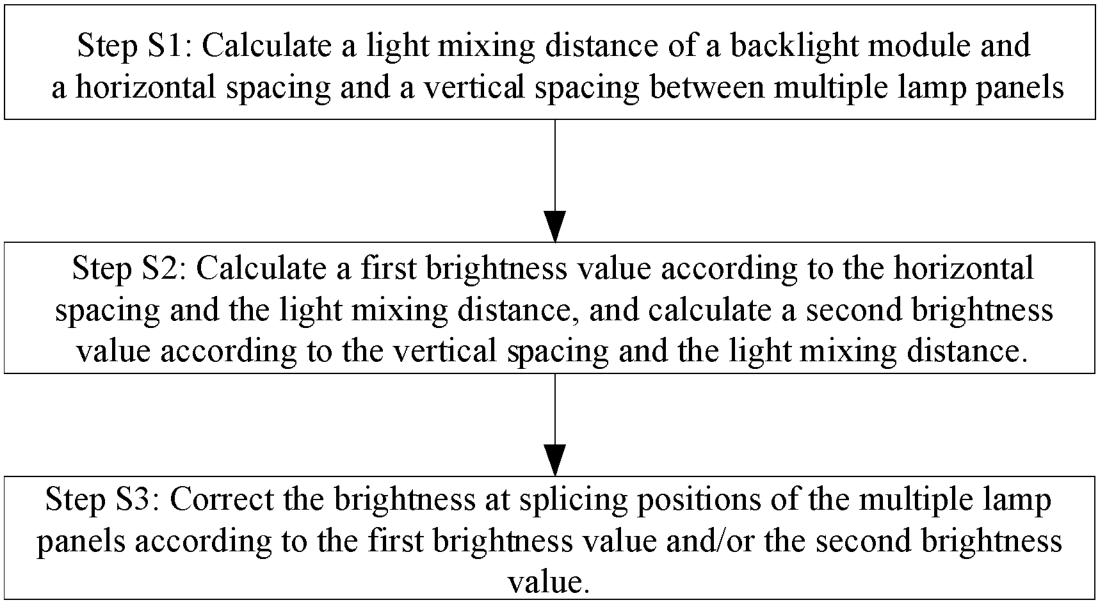
FIG. 1 is a flowchart of a method for adjusting backlight brightness according to an embodiment of the present disclosure.

Embodiments of the present disclosure will be described below in with reference to the drawings in detail. The embodiments in the present disclosure and features in the embodiments may be combined randomly with each other if there is no conflict.

Unless otherwise defined, technical terms or scientific terms publicly used in the embodiments of the present disclosure should have common meanings understood by those of ordinary skills in the art to which the embodiments of the present disclosure pertain. “First”, “second”, and similar terms used in the embodiments of the present disclosure do not represent any order, quantity, or importance, but are only used for distinguishing different components. “Include”, “contain”, or a similar wording means that an element or object appearing before the wording covers an element or object listed after the wording and equivalent thereof and does not exclude other elements or objects.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements vary as appropriate according to a direction of a described constituent element. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, a connection may be a fixed connection, or a detachable connection, or an integrated connection. It may be a mechanical connection or an electrical connection. It may be a direct mutual connection, or an indirect connection through a middleware, or an internal communication between two elements. Those of ordinary skills in the art may understand meanings of the aforementioned terms in the present disclosure according to actual situations.

In order to achieve a large-size display effect, in many cases, it is necessary to splice multiple lamp panels to form a large-size display device. In case of a small light mixing distance of a display device, e.g. Mini LED backlight technology is used, a mixing distance of Mini LED light is relatively small, which requires relatively high precision of splicing assembly. In an actual product assembly process, it is difficult to ensure consistency of precision among multiple lamp panels, and there will be certain errors during processing of structures. The inconsistency of precision among multiple lamp panels, errors of distances between lamp panels, the differences of distances between lamp panels and differences between light mixing distances will lead to dark fringes or bright fringes at splicing positions of lamp panels.

An embodiment of the present disclosure provides a method for adjusting backlight brightness, which is configured to adjust brightness at a splicing position of lamp panels on a backlight module. The backlight module includes multiple lamp panels arranged in an array, and the multiple lamp panels arranged in the array are disposed on the backlight module in a splicing manner. The method for adjusting the backlight brightness may include:

- calculating a light mixing distance of the backlight module and a horizontal spacing and a vertical spacing between multiple lamp panels;
- calculating a first brightness value according to the horizontal spacing and the light mixing distance, and calculating a second brightness value according to the vertical spacing and the light mixing distance; and
- adjusting brightness at splicing positions of the multiple lamp panels according to at least one of the first brightness value and the second brightness value.

In the method for adjusting backlight brightness according to the embodiment of the present disclosure, the light mixing distance and the horizontal spacing and the vertical spacing between multiple lamp panels are obtained through calculation, the first brightness value and the second brightness value are calculated according to the light mixing distance and the horizontal spacing and the vertical spacing between the multiple lamp panels, adjusts the brightness at splicing positions of the multiple lamp panels according to the first brightness value and the second brightness value, which overcomes the defects that dark fringes or bright fringes occurs at the splicing positions of the lamp panels due to an inconsistency of precision between the multiple lamp panels, errors between distances between the lamp panels, differences of the distances between the lamp panels, and differences between the light mixing distances.

As shown in FIG. 1, a method for adjusting backlight brightness according to an embodiment of the present disclosure may include steps S1-S3:

Step S1: calculating a light mixing distance of a backlight module and a horizontal spacing and a vertical spacing between multiple lamp panels;

Step S2: calculating a first brightness value according to the horizontal spacing and the light mixing distance, and calculating a second brightness value according to the vertical spacing and the light mixing distance; and Step S3: adjusting brightness at splicing positions of the multiple lamp panels according to at least one of the first brightness value and the second brightness value.

In an embodiment of the present disclosure, a light mixing distance may be called an Optical Distance (OD for short). In an embodiment of the present disclosure, the light mixing distance refers to a vertical distance between a lamp panel and a light guide plate. Generally, the larger the light mixing distance, the more fully the light mixing of the light beam emitted from the lamp panel, and the better the visual effect.

Figure 2A:
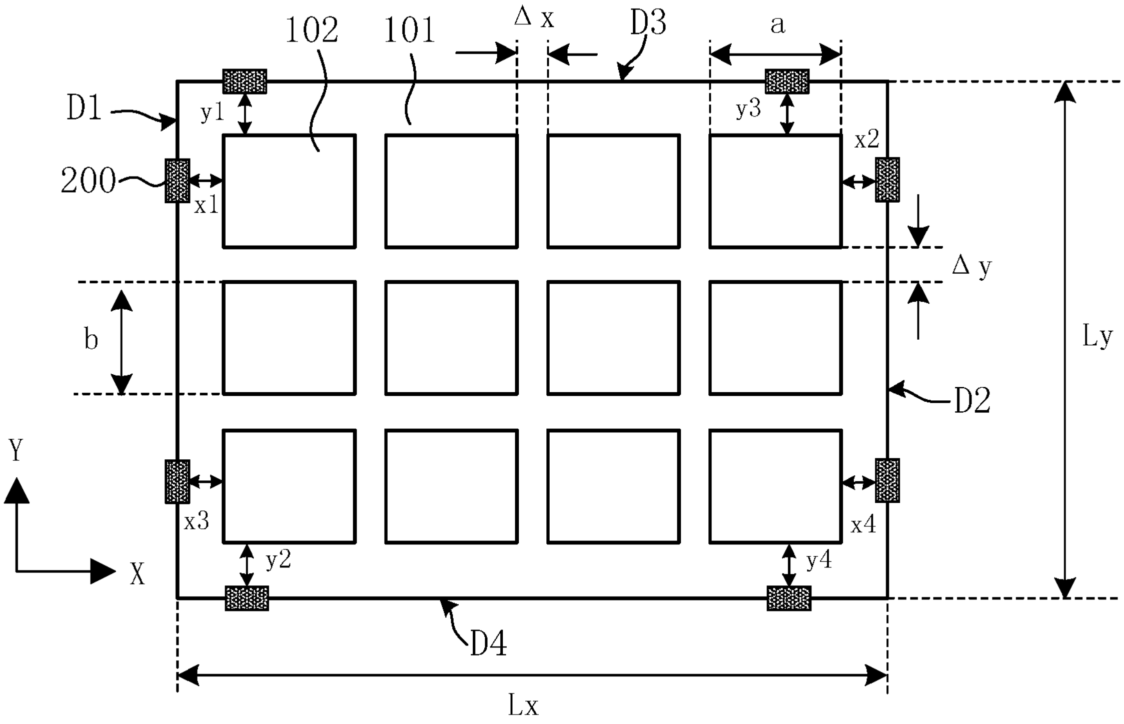
FIG. 2*a* is a schematic diagram of a planar structure of a backlight module according to an exemplary embodiment of the present disclosure.
Figure 2B:
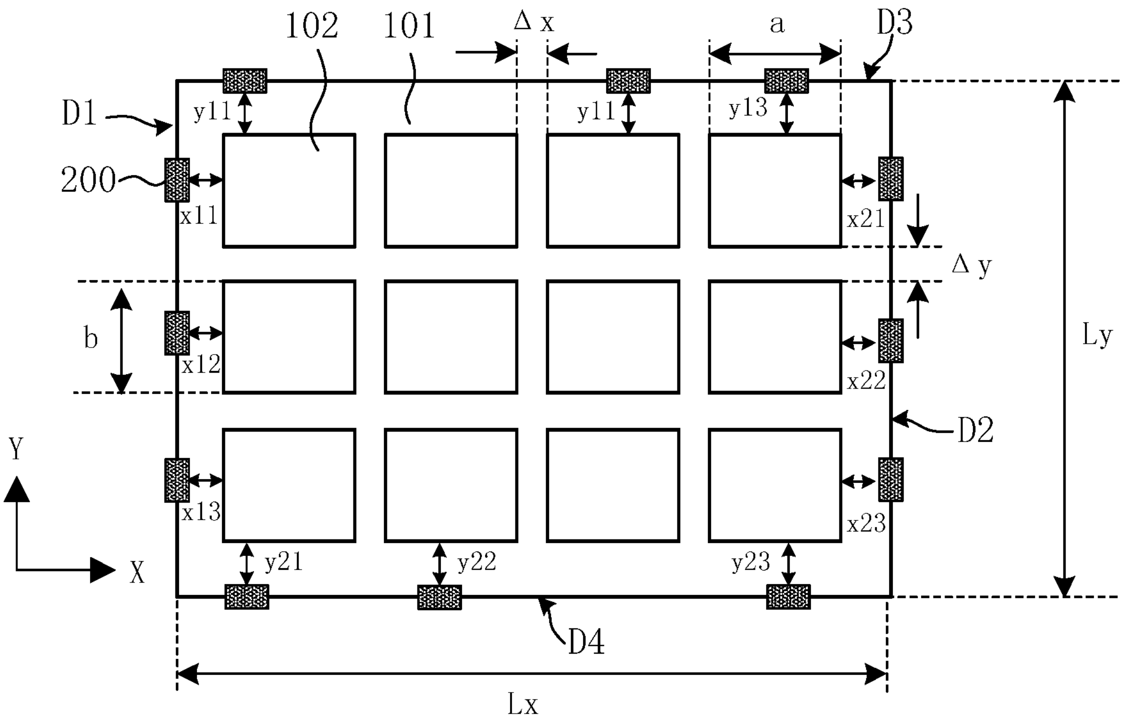
FIG. 2*b* is a schematic diagram of a planar structure of a backlight module according to an exemplary embodiment of the present disclosure.

As shown in FIG. 2*a* and FIG. 2*b*, the backlight module 101 may include multiple lamp panels 102 arranged in an array, the multiple lamp panels 102 arranged in the array disposed on the backlight module 101 in a splicing manner and multiple sensors 200 may be disposed on edges of the backlight module 101.

In an embodiment of the present disclosure, as shown in FIG. 2*a* and FIG. 2*b*, the horizontal spacing $\Delta x$ between multiple lamp panels of the backlight module 101 is a distance between two adjacent lamp panels 102 in a first direction X on a plane where the backlight module is located; the vertical spacing $\Delta y$ between multiple lamp panels 102 of the backlight module 101 is a distance between two adjacent lamp panels 102 in a second direction Y on the plane where the backlight module 101 is located.

In an embodiment of the present disclosure, as shown in FIG. 2*a* and FIG. 2*b*, the backlight module 101 includes a first end D1 and a second end D2 oppositely disposed in the first direction X, and a third end D3 and a fourth end D4 oppositely disposed in the second direction Y. A length of the backlight module 101 in the first direction X is a distance between the first end D1 and the second end D2, and a length of the backlight module 101 in the second direction Y is a distance between the third end D3 and the fourth end D4. In an exemplary implementation, calculating the horizontal spacing between the multiple lamp panels in step S1 may include steps M11-M12:

Step M11: acquiring a length Lx of the backlight module 101 in the first direction X, a length a of a lamp panel 102 in the first direction X, and multiple horizontal distances between lamp panels 102 located at two ends in the first direction X among the multiple lamp panels 102 and edges of the backlight module 101 (the multiple horizontal distances include a first horizontal distance x1, a second horizontal distance x2, a third horizontal distance x3, and a fourth horizontal distance x4);

In an exemplary implementation, acquiring the multiple horizontal distances between the lamp panels 102 located at the two ends in the first direction X among the multiple lamp panels 102 and the edges of the backlight module 101 can be performed by measuring the distances using sensors 200 disposed at the edges of the two ends of the backlight module 101 in the first direction X.

In an exemplary implementation, the sensors 200 may be distance sensors.

Step M12: calculating the horizontal spacing according to the multiple horizontal distances, the length Lx of the backlight module 101 in the first direction X, and the length a of the lamp panel 102 in the first direction X.

In an exemplary implementation, the aforementioned step M11 may include acquiring a first horizontal distance x1 (a distance between an edge of a lamp panel located in the first row and the first column close to the first end D1 of the backlight module 101 and the first end D1 of the backlight module) and a second horizontal distance x2 (a distance between an edge of a lamp panel located in the first row and the last column close to the second end D2 of the backlight module 101 and the second end D2 of the backlight module) between two ends of the first row of the multiple lamp panels arranged in an array in the first direction X and edges of the backlight module 101, respectively, and acquiring a third horizontal distance x3 (a distance between an edge of a lamp panel located in the first row and the last column close to the first end D1 of the backlight module 101 and the first end D1 of the backlight module) and a fourth horizontal distance x4 (a distance between an edge of the lamp panel located in the last row and the last column close to the second end D2 of the backlight module 101 and the second end D2 of the backlight module) between two ends of the last row of the multiple lamp panels arranged in an array in the first direction X and edges of the backlight module 101, respectively.

In the aforementioned step M12, calculating the horizontal spacing according to the multiple horizontal distances, the length Lx of the backlight module 101 in the first direction X, and the length a of the lamp panel in the first direction X, can be performed by the following formula:

$$\Delta x = \frac{1}{2}\left(\frac{Lx - (x_1 + x_2 + na)}{n-1} + \frac{Lx - (x_3 + x_4 + na)}{n-1}\right),$$

among them, Δx is the horizontal spacing between multiple lamp panels, Lx is the length of the backlight module in the first direction, $x_1$ is the first horizontal distance, $x_2$ is the second horizontal distance, $x_3$ is the third horizontal distance, $x_4$ is the fourth horizontal distance, n is a quantity of columns of the multiple lamp panels arranged in an array (which may be understood as a quantity of lamp panels per row), and a is a length of a lamp panel in the first direction.

In an exemplary implementation, the aforementioned Step M11 may include: acquiring multiple first horizontal distances (multiple distances between edges of multiple lamp panels located in the first column close to the first end D1 of the backlight module 101 and the first end D1 of the backlight module, which may include x11, x12, x13) and multiple second horizontal distances (multiple distances between edges of multiple lamp panels located in the last column close to the second end D2 of the backlight module 101 and the second end D2 of the backlight module, which may include x21, x22, x23) between two ends of the multiple lamp panels arranged in an array in the first direction X and edges of the backlight module 101, respectively, calculating an average value of the multiple first horizontal distances to obtain the average value of the first horizontal distances, and calculating an average value of the multiple second horizontal distances to obtain the average value of the second horizontal distances; for example, the average value of the first horizontal distances is calculated by formula:

$$\overline{x_1} = \frac{(x11 + \ldots + x1m)}{m},$$

among them, m may be an integer greater than or equal to 2. As shown in FIG. 2*b*, the first horizontal distances include x11, x12, and x13, then the obtained average value of the first horizontal distances may be $$\overline{x_1} = \frac{(x11 + x12 + x13)}{3}.$$

The average value of the second horizontal distances is calculated by formula:

$$\overline{x2} = \frac{(x21 + \ldots + x2m)}{m},$$

among them, m may be an integer greater than or equal to 2. As shown in FIG. 2*b*, the second horizontal distances include x21, x22, and x23, then the obtained average value of the second horizontal distances may be $$\overline{x_2} = \frac{(x21 + x22 + x23)}{3}.$$

In the aforementioned Step M12, the horizontal spacing is calculated according to the multiple horizontal distances, a length of a backlight module in the first direction, and a length of a lamp panel in the first direction, and is calculated by the following formula:

$$\Delta x = \frac{Lx - (\overline{x_1} + \overline{x_2} + na)}{n-1},$$

among them, Δx is the horizontal spacing between the multiple lamp panels, Lx is the length of the backlight module in the first direction, $\overline{x_1}$ is the average value of the first horizontal distances, $\overline{x_2}$ is the average value of the second horizontal distances, n is the quantity of columns of the multiple lamp panels arranged in an array, and a is the length of the lamp panel in the first direction.

In an exemplary implementation, in the aforementioned Step S2, the first brightness value is calculated according to the horizontal spacing and the light mixing distance, which may be obtained by the following formula:

$$H_x = \frac{k_1 \times \Delta x}{h},$$

among them, $H_x$ is a first brightness value, $k_1$ is a first brightness reference value, and h is a light mixing distance.

In an implementation of the present disclosure, before Step S2, it may also include obtaining the first brightness reference value; the first brightness reference value $k_1$ can be obtained through Step L11-Step L12:

Step L11: acquiring multiple sets of horizontal spacings Δx, and multiple sets of light mixing distances h and brightness values corresponding to the multiple sets of horizontal spacings Δx, calculating a ratio of each set of the horizontal spacings Δx to each set of the light mixing distances h (the calculation formula may be $$\frac{\Delta x}{h})$$

to obtain the multiple sets of first brightness values corresponding to a ratio of 1 between the horizontal spacings Δx and the light mixing distances h respectively; and Step L12: calculating an average value of the multiple sets of first brightness values to obtain a first brightness reference value. In an exemplary implementation, calculating the vertical spacing between multiple lamp panels in the aforementioned Step S1 may include Step M21-Step M22:

Step M21: acquiring a length Ly of the backlight module 101 in the second direction Y, a length b of a lamp panel 102 in the second direction Y, and multiple vertical distances between the multiple lamp panels 102 located at two ends in the second direction Y among the multiple lamp panels and edges of the backlight module 101.

In an exemplary implementation, acquiring the multiple vertical distances between the lamp panel 102 located at the two ends in the second direction Y among the multiple lamp panels and the edges of the backlight module 101 can be performed by sensors 200 disposed at the edges of the two ends of the backlight module 101 in the second direction Y.

Step M22: calculating a vertical spacing according to multiple vertical distances, the length of the backlight module 101 in the second direction Y, and the length b of the lamp panel 102 in the second direction Y.

In an exemplary implementation, the aforementioned step M21 may include: acquiring a first vertical distance y1 (a distance between an edge of a lamp panel located in the first row and the first column close to the third end D3 of the backlight module 101 and the third end D3 of the backlight module) and a second vertical distance y2 (a distance between an edge of a lamp panel located in the first column and the last row close to the fourth end D4 of the backlight module 101 and the fourth end D4 of the backlight module) between two ends of the first column of the multiple lamp panels 102 arranged in an array in the second direction Y and edges of the backlight module 101, respectively, and acquiring a third vertical distance y3 (a distance between an edge of a lamp panel located in the last column and the first row close to the third end D3 of the backlight module 101 and the third end D3 of the backlight module) and a fourth vertical distance y4 (a distance between an edge of a lamp panel located in the last column and the last row close to the fourth end D4 of the backlight module 101 and the fourth end D4 of the backlight module) between two ends of the last column of the multiple lamp panels arranged in an array in the second direction Y and edges of the backlight module 101, respectively.

In the aforementioned step M22, the vertical spacing is calculated according to the multiple vertical distances, the length Ly of the backlight module 101 in the second direction Y, and the length b of the lamp panel in the second direction Y, which can be calculated by the following formula:

$$\Delta y = \frac{1}{2}\left(\frac{Ly - (y_1 + y_2 + nb)}{n-1} + \frac{Ly - (y_3 + y_4 + nb)}{n-1}\right),$$

among them, Δy is the vertical spacing between multiple lamp panels, Ly is the length of the backlight module in the second direction, $y_1$ is the first vertical distance, $y_2$ is the second vertical distance, $y_3$ is the third vertical distance, $y_4$ is the fourth vertical distance, n is a quantity of rows of the multiple lamp panels arranged in an array, and b is a length of a lamp panel in the second direction.

In an exemplary implementation, the aforementioned step M2 may include: acquiring multiple first vertical distances (multiple distances between edges of multiple lamp panels located in the first row close to the third end D3 of the backlight module 101 and the third end D3 of the backlight module, which may include y11, y12, y13) and multiple second vertical distances (multiple distances between edges of multiple lamp panels located in the last row close to the fourth end D4 of the backlight module 101 and the fourth end D4 of the backlight module, which may include y21, y22, y23) between two ends of the lamp panels 102 arranged in an array in the second direction Y and edges of the backlight module 101, calculating an average value of the multiple first vertical distances to obtain the average value of the first vertical distances, and calculating an average value of the multiple second vertical distances to obtain the average value of the second vertical distances, for example, the average value of the first vertical distances is calculated by formula:

$$\overline{y}_1 = \frac{(y11 + \ldots + y1m)}{m},$$

among them, m may be an integer greater than or equal to 2. As shown in FIG. 2*b*, the first vertical distance includes y11, y12, and y13, then the obtained average value of the first vertical distances may be $$\overline{y}_1 = \frac{(x11 + x12 + x13)}{3}.$$

The average value of the second vertical distances is calculated by formula:

$$\overline{y2} = \frac{(y21 + \ldots + y2m)}{m},$$

among them, m may be an integer greater than or equal to 2. As shown in FIG. 2*b*, the second vertical distance includes y21, y22, and y23, then the obtained average value of the second vertical distance may be $$\overline{y}_2 = \frac{(y21 + y22 + y23)}{3}.$$

In the aforementioned Step M22, the vertical spacing is calculated according to the multiple vertical distances, a length of a backlight module in the second direction, and a length of a lamp panel in the second direction, and is calculated by the following formula:

$$\Delta y = \frac{Ly - (\overline{y}_1 + \overline{y}_2 + nb)}{n - 1},$$

among them, Δy is the vertical spacing between the multiple lamp panels, Ly is the length of the backlight module in the second direction, $\overline{y_1}$ is an average value of the first vertical distances, $\overline{y_2}$ is an average value of the second vertical distances, n is a quantity of rows of the multiple lamp panels arranged in an array, and b is the length of the lamp panel in the second direction.

In an exemplary implementation, in the aforementioned Step S2, the second brightness value is calculated according to the vertical spacing and the light mixing distance, which may be obtained by the following formula:

$$H_y = \frac{k_2 \times \Delta y}{h},$$

among them, $H_y$ is the second brightness value, $k_2$ is a second brightness reference value, and h is a light mixing distance.

In an implementation of the present disclosure, before Step S2, the method may further include acquiring a second brightness reference value, and the second brightness reference value $k_1$ may be obtained through Step L21-Step L22:

Step L21: acquiring multiple sets of horizontal spacings Δx, multiple sets of light mixing distances h and brightness values corresponding to the multiple sets of horizontal spacings Δx, calculating the ratio of each set of the horizontal spacings Δx to each set of the light mixing distances h (the calculation formula may be $$\frac{\Delta x}{h})$$

to obtain multiple sets of second brightness values corresponding to a ratio of 1 between the horizontal spacings Δx and the light mixing distances h respectively; and Step L22: calculating an average value of the multiple sets of second brightness values to obtain the second brightness reference value.

Figure 3:
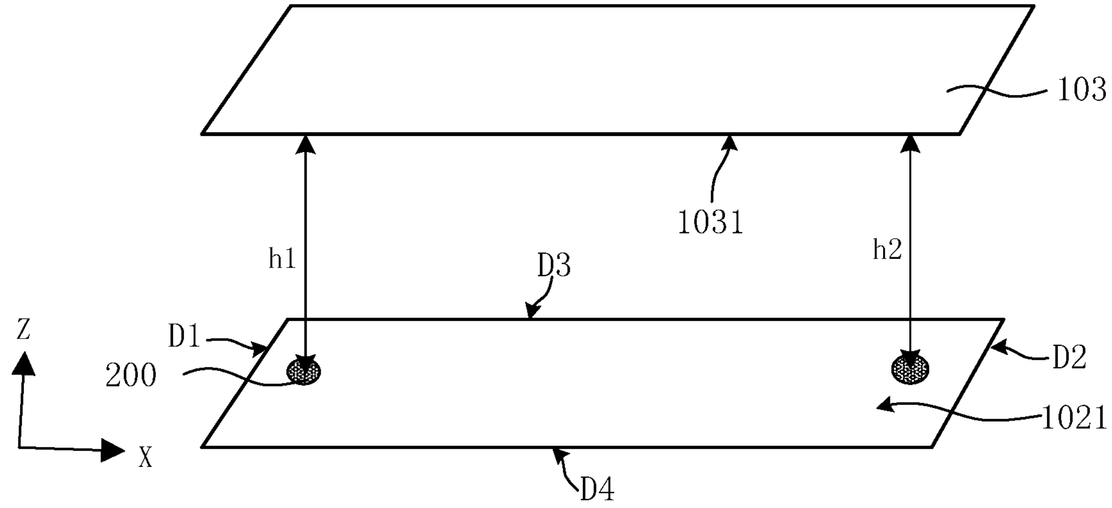
FIG. 3 is a schematic diagram of a structure of a lamp panel and a light guide plate according to an exemplary embodiment of the present disclosure.

In an exemplary implementation, as shown in FIG. 3, the backlight module 101 may further include a light guide plate 103. A light mixing distance of the backlight module 101 is a vertical distance in a third direction Z between a surface 1021 of a lamp panel 102 facing the light guide plate 103 and a surface 1031 of the light guide plate 103 facing the lamp panel in a direction perpendicular to the plane where the backlight module 101 is located (the third direction is Z direction). Calculating the light mixing distance of the backlight module in the aforementioned Step S1 may include Step H11-Step H12:

Step H11: acquiring multiple light mixing distances between multiple lamp panels 102 and a light guide plate 103.

As shown in FIG. 3, the light mixing distances between the multiple lamp panels 102 and the light guide plate 103 are distances in the third direction Z between the surfaces 1021 of the lamp panels 102 facing the light guide plate 103 and the surface 1031 of the light guide plate 103 facing the lamp panels.

In an exemplary implementation, Step H11 may include acquiring a first light mixing distance $h_1$ (a distance between a lamp panel close to the first end D1 of the backlight module 101 and the light guide plate in FIG. 3) and a second light mixing distance $h_2$ (a distance between a lamp panel close to the second end D2 of the backlight module 101 and the light guide plate in FIG. 3) between lamp panels located at two ends of the backlight module 101 in the first direction X or the second direction Y and the light guide plate.

In an exemplary implementation, a distance sensor 200 may be disposed on a surface 1021 of a lamp panel 102 facing the light guide plate 103, and a first light mixing distance $h_1$ and a second light mixing distance $h_2$ between the lamp panel 102 and the light guide plate 103 may be obtained and measured by the distance sensor 200 on the lamp panel 102.

Step H12: calculating an average value of the multiple light mixing distances to obtain the light mixing distance.

Step H12: calculating an average value of the multiple light mixing distances to obtain the light mixing distance.

In an exemplary implementation, the average value of the multiple light mixing distances is calculated in Step H12 to obtain the light mixing distance, which may be calculated by the following formula:

$$h = \frac{1}{2}(h_1 + h_2),$$

among them, h is the light mixing distance, $h_1$ is the first light mixing distance, $h_2$ is the second light mixing distance.

Figure 4:
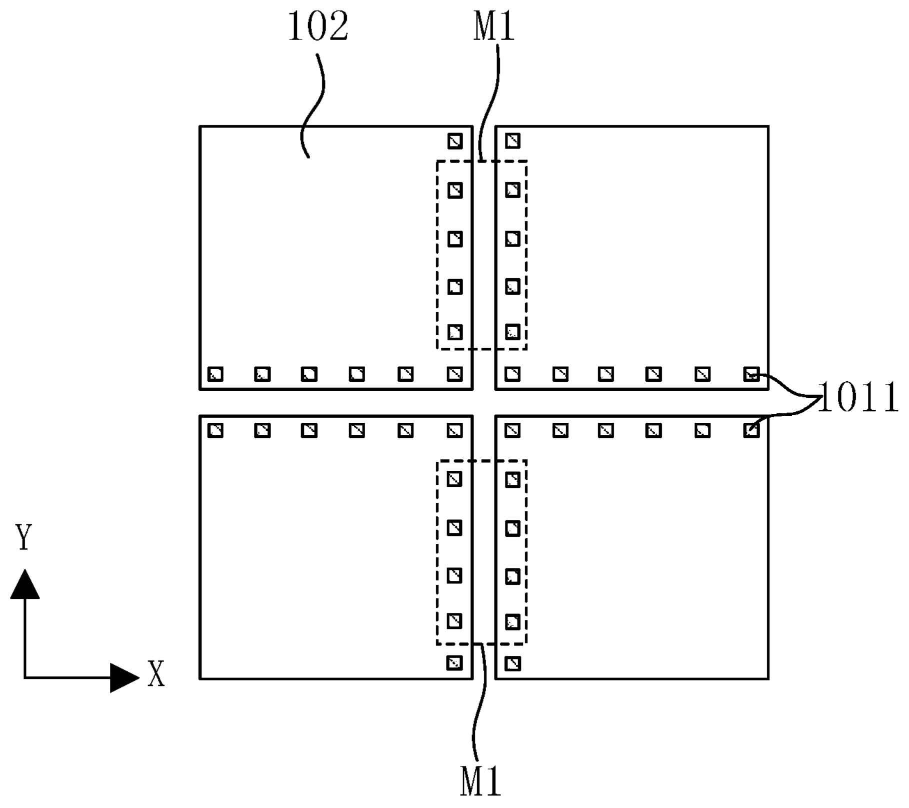
FIG. 4 is a schematic diagram of a planar structure at a splicing position of lamp panels according to an embodiment of the present disclosure.

In an exemplary implementation, adjusting brightness at splicing positions of the multiple lamp panels according to the first brightness value in Step S3 may include adjusting brightness of adjacent lamp panels 102 at a first splicing position in the first direction X according to the first brightness value and the first preset brightness value. In an embodiment of the present disclosure, the first preset brightness value and the first preset current value can be set in correspondence, the first brightness value and the first current value can be set in correspondence (each brightness value of the first brightness value corresponds to one first current value). When a first current value corresponding to a first brightness value is greater than the first preset current value, the first current value is reduced to the first preset current value, and when a first current value corresponding to a first brightness value is smaller than the first preset current value, the first current value is increased to the first preset current value. As shown in FIG. 4, brightness of adjacent lamp panels 102 at first splicing positions M1 may be adjusted according to the first brightness value and the first preset brightness value. In an embodiment of the present disclosure, in a case that bright fringes appear at a first splicing position M1 of adjacent lamp panels, the first current value corresponding to the first brightness value is greater than the first preset current value, and the first current value of backlight sources of the adjacent lamp panels 102 at the first splicing position M1 can be reduced to the first preset current value. In a case that dark fringes appear at a first splicing position M1 of adjacent lamp panels 102, the first current value corresponding to the first brightness value is smaller than the first preset current value, and the first current value of backlight sources of the adjacent lamp panels 102 at the first splicing position M1 can be increased to the first preset current value. In a case that no dark fringes or bright fringes appear at a first splicing position M1 of adjacent lamp panels 102, the first current value corresponding to the first brightness value is close to the first preset current value, and the first current value of backlight sources of the adjacent lamp panels 102 at the first splicing position M1 may not be adjusted.

Figure 5:
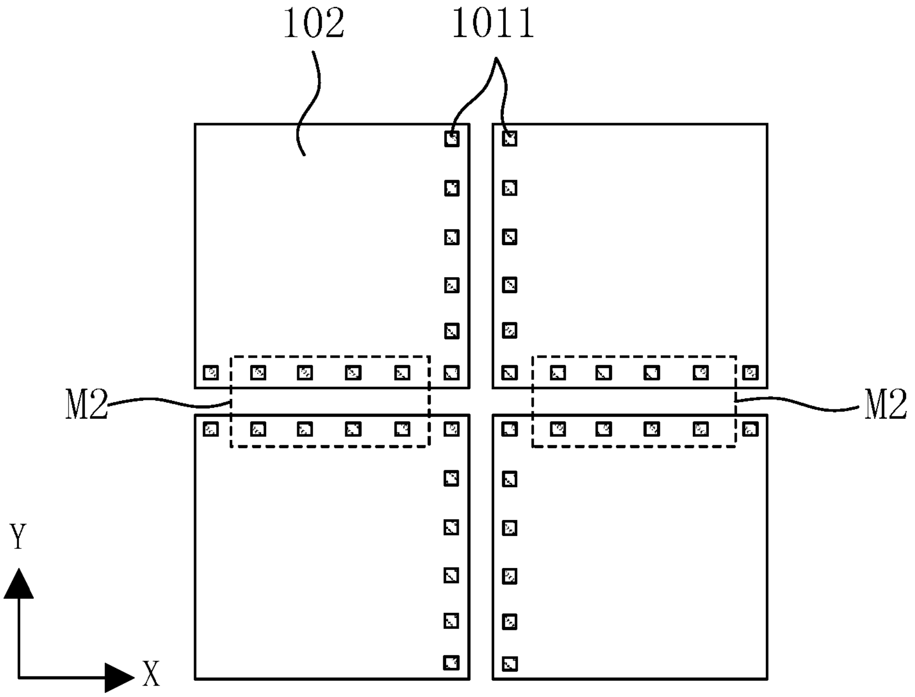
FIG. 5 is a schematic diagram of a planar structure at a splicing position of lamp panels according to an embodiment of the present disclosure.

In an exemplary implementation, adjusting the brightness at the splicing positions of the multiple lamp panels according to the second brightness value in Step S3 may include adjusting brightness of adjacent lamp panels at a second splicing position in the second direction according to the second brightness value and a second preset brightness value. In an embodiment of the present disclosure, the second preset brightness value and the second preset current value can be set in correspondence, the second brightness value and the second current value can be set in correspondence (each brightness value of the second brightness value corresponds to one second current value). When a second current value corresponding to a second brightness value is greater than the second preset current value, the second current value can be reduced to the second preset current value, and when a second current value corresponding to a second brightness value is smaller than the second preset current value, the second current value can be increased to the second preset current value. As shown in FIG. 5, brightness of adjacent lamp panels 102 at second splicing positions M2 may be adjusted according to the second brightness value and the second preset brightness value. In an embodiment of the present disclosure, in a case that bright fringes appear at a second splicing position M2 of adjacent lamp panels, the second current value corresponding to the second brightness value is greater than the second preset current value, and the second current value of backlight sources of adjacent lamp panels at the second splicing position M2 is reduced to the second preset current value. In a case that dark fringes appear at a second splicing position M2 of adjacent lamp panels 102, the second current value corresponding to the second brightness value is smaller than the second preset current value, and the second current value of backlight sources of the adjacent lamp panels 102 at the second splicing position M2 is increased to the second preset current value.

In an exemplary implementation, adjusting brightness at the splicing positions of the multiple lamp panels according to the first brightness value and the second brightness value in Step S3 may include Step N11-Step N12:

Step N11: calculating a third brightness value according to the first brightness value and the second brightness value.

In an exemplary implementation, Step N11 may include calculating an average value of the first brightness value and the second brightness value to obtain the third brightness value. For example, through the formula $$H = \frac{H_x + H_y}{2},$$

the third brightness value is calculated, among them, H is the third brightness value, Hx is the first brightness value, and Hy is the second brightness value.

Step N12: adjusting brightness of the multiple lamp panels at a third splicing position according to the third brightness value.

Figure 6:
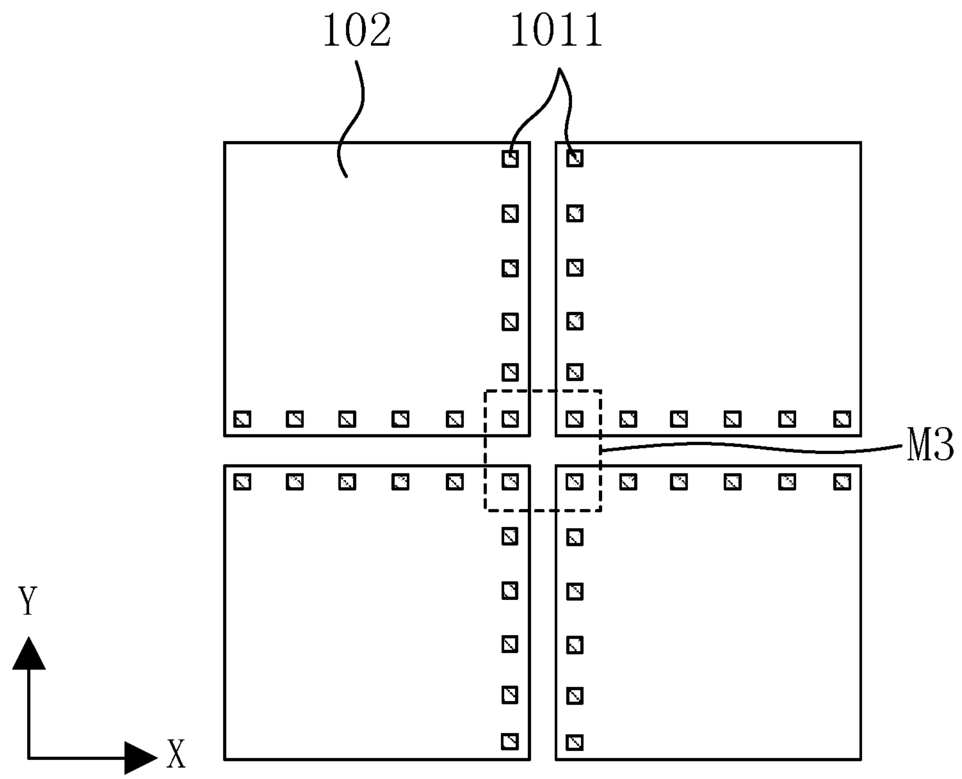
FIG. 6 is a schematic diagram of a planar structure at a splicing position of lamp panels according to an embodiment of the present disclosure.

In an exemplary implementation, Step N12 may include adjusting brightness of lamp panels adjacent in the first direction and the second direction at the third splicing position according to the third brightness value and a third preset brightness value. In an embodiment of the present disclosure, the third preset brightness value and the third preset current value can be set in correspondence, the third brightness value and the third current value can be set in correspondence (each brightness value of the third brightness value corresponds to one third current value). When a third current value corresponding to a third brightness value is greater than the third preset current value, the third current value is reduced to the third preset current value, and when a third current value corresponding to a third brightness value is smaller than the third preset current value, the third current value is increased to the third preset current value. As shown in FIG. 6, brightness of lamp panels 102 at a third splicing position M3 may be adjusted according to the third brightness value and the third preset brightness value. In an embodiment of the present disclosure, in a case that bright fringes appear at a third splicing position M3 of multiple lamp panels, the third current value corresponding to the third brightness value is larger than the third preset current value, and the third current value of backlight sources of the multiple lamp panels at the third splicing position M3 can be reduced to the third preset current value. In a case that dark fringes appear at a third splicing position M3 of the lamp panels, the third current value corresponding to the third brightness value is smaller than the third preset current value, and the third current value of backlight sources of the multiple lamp panels at the third splicing position M3 can be increased to the third preset current value.

Figure 7:
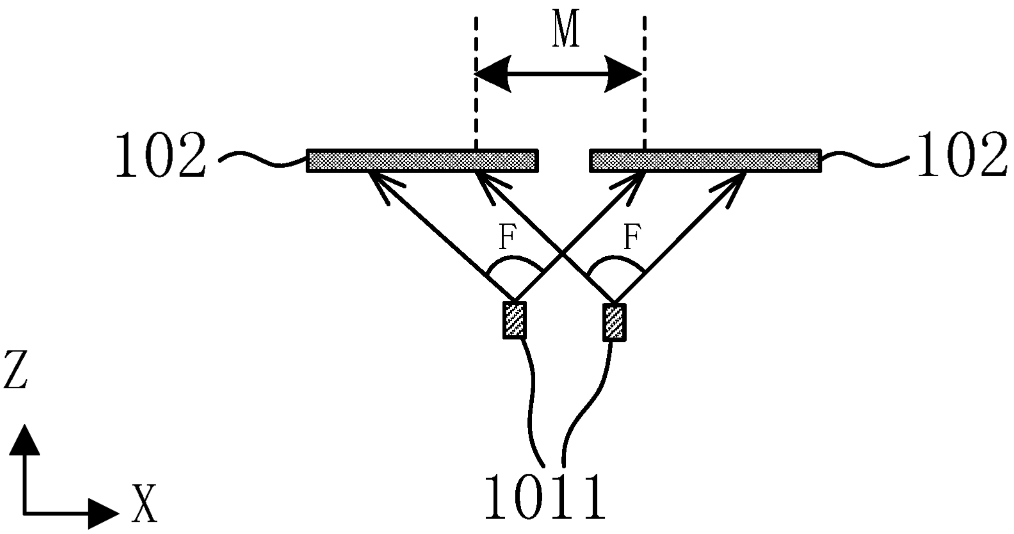
FIG. 7 is a schematic diagram of a sectional structure at a splicing position of lamp panels according to an embodiment of the present disclosure.

In an exemplary implementation, in the aforementioned Step S3, adjusting the brightness at the splicing positions of the multiple lamp panels according to at least one of the first brightness value and the second brightness value may include adjusting brightness of a backlight source at a splicing position of multiple lamp panels on the backlight module according to at least one of the first brightness value and the second brightness value, thereby achieving the adjustment of brightness at the splicing positions of the lamp panels. As shown in FIG. 4-FIG. 7, 1011 denotes a backlight source on the backlight module 101, for example, the backlight source may be a backlight lamp. FIG. 7 shows a schematic diagram of a sectional structure at a splicing position of lamp panels, and M in FIG. 7 may be the first splicing position M1 in FIG. 4, or may be the second splicing position M2 in FIG. 5, or may be the third splicing position M3 in FIG. 6, wherein an included angle F in FIG. 7 is an included angle of a light irradiation region of the backlight source 1011 on the backlight module 101.

In an embodiment of the present disclosure, lamp sources arranged in an array are provided on the lamp panel 102, as shown in FIG. 4 to FIG. 6, adjusting the brightness at the first splicing position M1 may be to adjust brightness of backlight sources at the first splicing position M1 on the backlight module 101, and the backlight sources at the first splicing position M1 may include backlight sources located between a first row and a last row among multiple backlight sources of two adjacent columns in two lamp panels 102 adjacent in the first direction X. Adjusting brightness at the second splicing position M2 may be to adjust brightness of backlight sources at the second splicing position M2 on the backlight module 101, and the backlight sources at the second splicing position M2 may include backlight sources located between the first column and the last column among multiple backlight sources of two adjacent rows in two adjacent lamp panels 102 in the second direction Y. Adjusting brightness at the third splicing position M3 may be to adjust brightness of backlight sources at the third splicing position M3 on the backlight module 101, and the backlight sources at the third splicing position M3 may include backlight sources at corners of four lamp panels 102 adjacent in the first direction X and in the second direction Y.

In an embodiment of the present disclosure, there is no overlapping area among three, that is, an orthographic projection of the first splicing position M1 on a plane where the backlight module 101 is located, an orthographic projection of the second splicing position M2 on the plane where the backlight module 101 is located, and an orthographic projection of the third splicing position M3 on the plane where the backlight module 101 is located.

Figure 8:
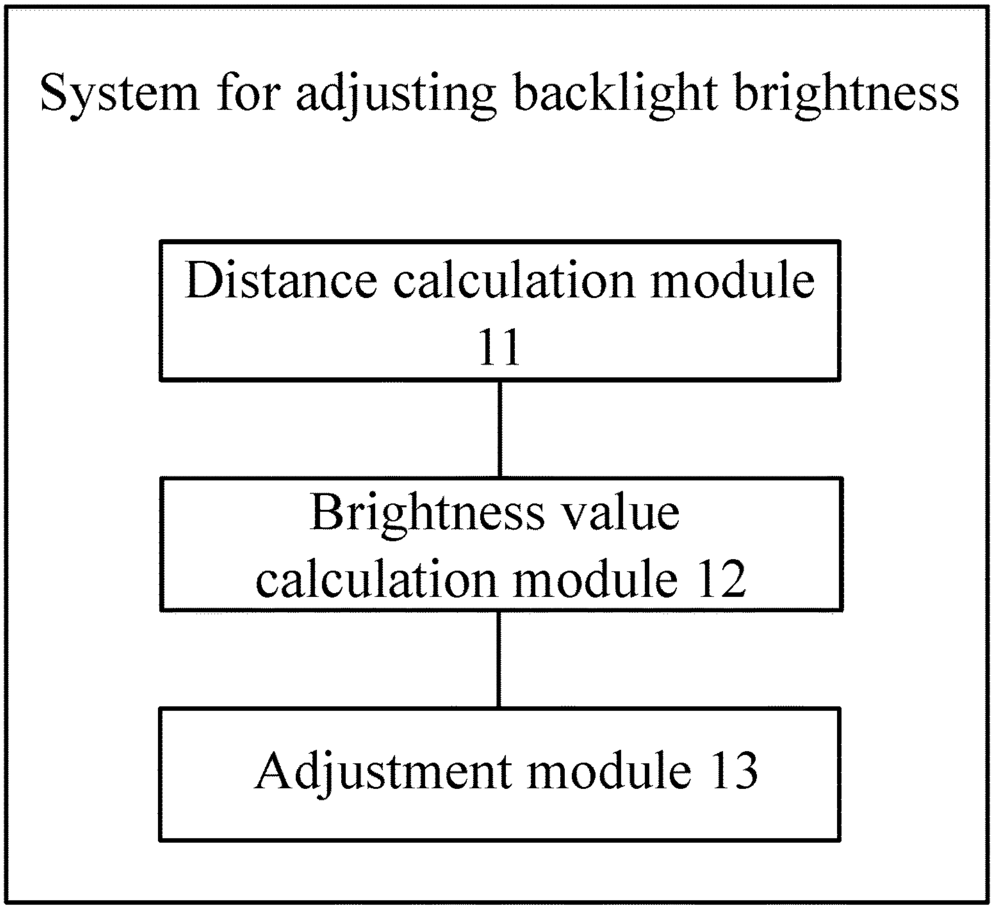
FIG. 8 is a schematic diagram of a structure of a system for adjusting backlight brightness according to an embodiment of the present disclosure.

An embodiment of the present disclosure further provides a system for adjusting the backlight brightness, which is configured to adjust brightness at splicing positions of lamp panels on the backlight module. The backlight module includes multiple lamp panels arranged in an array, and the multiple lamp panels arranged in an array are disposed on the backlight module in a splicing manner. As shown in FIG. 8, it is a schematic diagram of a structure of a system for adjusting backlight brightness, and the system may include:

- a distance calculation module 11 configured to calculate a light mixing distance and a horizontal spacing and a vertical spacing between multiple lamp panels;
- a brightness value calculation module 12 configured to calculate a first brightness value according to the horizontal spacing and the light mixing distance and calculate a second brightness value according to the vertical spacing and the light mixing distance; and
- an adjustment module 13 configured to adjust brightness at splicing positions of multiple lamp panels according to at least one of the first brightness value and the second brightness value.

Figure 9:
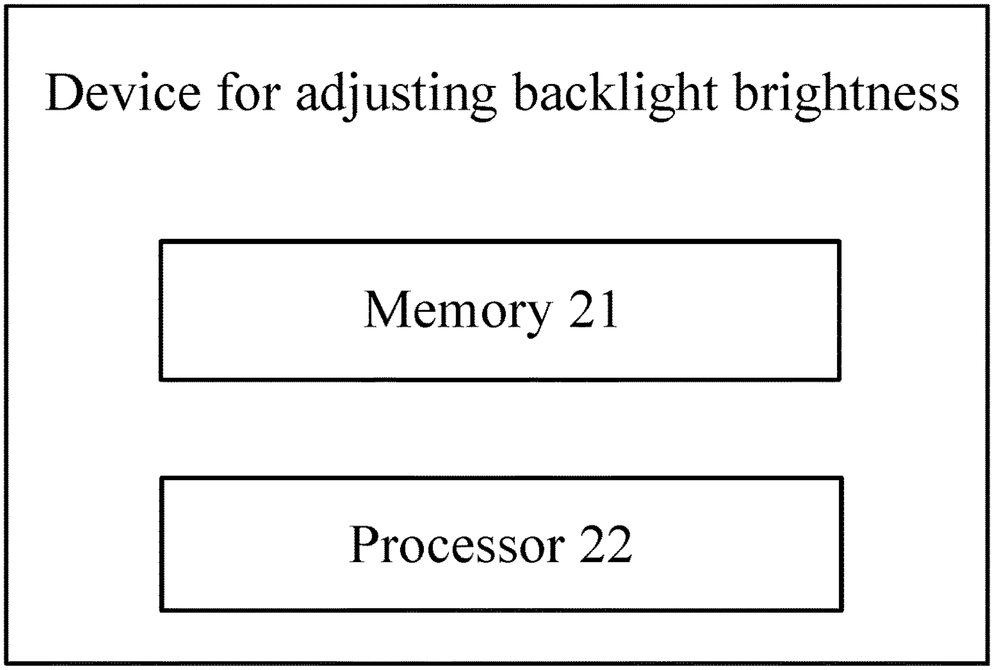
FIG. 9 is a schematic diagram of a structure of a device for adjusting backlight brightness according to an embodiment of the present disclosure.

An embodiment of the present disclosure further provides a device for adjusting the backlight brightness, which is configured to adjust brightness at splicing positions of lamp panels on the backlight module. The backlight module includes multiple lamp panels arranged in an array, and the multiple lamp panels arranged in an array are disposed on the backlight module in a splicing manner. As shown in FIG. 9, it is a schematic diagram of a structure of an adjustment device for backlight brightness. The adjustment system includes a memory 21, a processor 22, and a computer program stored in the memory and executable on the processor to execute:

- calculating a light mixing distance and a horizontal spacing and a vertical spacing between multiple lamp panels;
- calculating a first brightness value according to the horizontal spacing and the light mixing distance, and calculating a second brightness value according to the vertical spacing and the light mixing distance; and
- adjusting brightness at splicing positions of multiple lamp panels according to at least one of the first brightness value and the second brightness value.

An embodiment of the present disclosure further provides a non-transitory computer-readable storage medium, wherein the storage medium is configured to store computer program instructions, wherein when the computer program instructions are executed, the method for adjusting backlight brightness according to any one of the above embodiments may be implemented.

An embodiment of the present disclosure provides a method, a device, and a system for adjusting backlight brightness, and a storage medium, which obtains a light mixing distance and a horizontal spacing and a vertical spacing between multiple lamp panels through calculation, calculates a first brightness value and a second brightness value according to the light mixing distance and the horizontal spacing and the vertical spacing between multiple lamp panels, and adjusts brightness at splicing positions of the multiple lamp panels according to the first brightness value and the second brightness value, and overcomes the defects that dark fringes or bright fringes are generated at the splicing positions of the lamp panels due to an inconsistency of precision between multiple lamp panels, errors of distances between the lamp panels, differences of distances between the lamp panels, and differences between the light mixing distances.

It may be understood by those of ordinary skills in the art that all or some steps in a method and function modules/units in a system and a device disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology configured to store information (for example, a computer-readable instruction, a data structure, a program module, or other data). The computer storage medium includes, but not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

The drawings of the embodiments of the present disclosure only involve structures involved in the embodiments of the present disclosure, and other structures may refer to usual designs.

The embodiments of the present disclosure, i.e., features in the embodiments, may be combined with each other to obtain new embodiments if there is no conflict.

Although the implementations disclosed in the present disclosure are as above, the described contents are only implementations used for convenience of understanding the present disclosure and are not intended to limit the present disclosure. Any skilled person in the art to which the present invention pertains can make any modifications and alterations in forms and details of implementations without departing from the spirit and scope of the present disclosure. However, the patent protection scope of the present disclosure should be subject to the scope defined by the appended claims.

The invention claimed is:

1. A method for adjusting backlight brightness, wherein the method is used for adjusting brightness at splicing positions of lamp panels in a backlight module, the backlight module comprises a plurality of lamp panels arranged in an array, and the plurality of lamp panels arranged in the array are disposed on the backlight module in a splicing manner, the method comprises:

calculating a light mixing distance of the backlight module and a horizontal spacing and a vertical spacing between the plurality of lamp panels;

calculating a first brightness value according to the horizontal spacing and the light mixing distance, and calculating a second brightness value according to the vertical spacing and the light mixing distance; and adjusting brightness at the splicing positions of the plurality of lamp panels according to at least one of the first brightness value and the second brightness value, wherein the backlight module further comprises a light guide plate, and calculating the light mixing distance of the backlight module comprises:

acquiring a plurality of light mixing distances between the plurality of lamp panels and the light guide plate; and calculating an average value of the plurality of light mixing distances to obtain the light mixing distance, wherein acquiring the plurality of light mixing distances between the plurality of lamp panels and the light guide plate comprises: acquiring a first light mixing distance and a second light mixing distance between lamp panels located at two ends of the backlight module in a first direction or a second direction and the light guide plate; and the light mixing distance is obtained by calculating the average value of the plurality of light mixing distances, and is calculated by a following formula:

$$h = \frac{1}{2}(h_1 + h_2),$$

where h is the light mixing distance, $h_1$ is the first light mixing distance, and $h_2$ is the second light mixing distance.

2. The method according to claim 1, wherein calculating the horizontal spacing between the plurality of lamp panels comprises:

acquiring a length of the backlight module in the first direction, a length of a lamp panel in the first direction, and a plurality of horizontal distances between lamp panels located at two ends in the first direction among the plurality of lamp panels and edges of the backlight module;

the horizontal spacing is calculated according to the plurality of horizontal distances, the length of the backlight module in the first direction, and the length of the lamp panel in the first direction.

3. The method according to claim 2, wherein acquiring the plurality of horizontal distances between the lamp panels located at the two ends in the first direction among the plurality of lamp panels and the edges of the backlight module comprises: acquiring a first horizontal distance and a second horizontal distance between two ends of a first row of lamp panels arranged in the array in the first direction among the plurality of lamp panels and edges of the backlight module, respectively, and acquiring a third horizontal distance and a fourth horizontal distance between two ends of a last row of lamp panels arranged in the array in the first direction among the plurality of lamp panels and edges of the backlight module, respectively;

the horizontal spacing is calculated according to the plurality of horizontal distances, the length of the backlight module in the first direction, and the length of the lamp panel in the first direction by a following formula:

$$\Delta x = \frac{1}{2}\left(\frac{Lx - (x_1 + x_2 + na)}{n-1} + \frac{Lx - (x_3 + x_4 + na)}{n-1}\right),$$

where Δx is the horizontal spacing between the plurality of lamp panels, Lx is the length of the backlight module in the first direction, $x_1$ is the first horizontal distance, $x_2$ is the second horizontal distance, $x_3$ is the third horizontal distance, $x_4$ is the fourth horizontal distance, n is a quantity of columns of the plurality of lamp panels arranged in the array, and a is the length of the lamp panel in the first direction.

4. The method according to claim 3, wherein the first brightness value calculated from the horizontal spacing and the light mixing distance is obtained by a following formula:

$$H_x = \frac{k_1 \times \Delta x}{h},$$

where $H_x$ is the first brightness value, $k_1$ is a first brightness reference value, and h is the light mixing distance.

5. The method according to claim 2, wherein acquiring the plurality of horizontal distances between the lamp panels located at the two ends in the first direction among the plurality of lamp panels and the edges of the backlight module comprises: acquiring a plurality of first horizontal distances and a plurality of second horizontal distances between two ends of the plurality of lamp panels arranged in the array in the first direction and edges of the backlight module, respectively, calculating an average value of the plurality of first horizontal distances to obtain the average value of the first horizontal distances, and calculating an average value of the plurality of second horizontal distances to obtain the average value of the second horizontal distances;

the horizontal spacing is calculated according to the plurality of horizontal distances, the length of the backlight module in the first direction, and the length of the lamp panel in the first direction by a following formula:

$$\Delta x = \frac{Lx - (\bar{x}_1 + \bar{x}_2 + na)}{n-1},$$

where Δx is the horizontal spacing between the plurality of lamp panels, Lx is the length of the backlight module in the first direction, $\overline{x_1}$ is the average value of the first horizontal distances, $\overline{x_2}$ is the average value of the second horizontal distances, n is a quantity of columns of the plurality of lamp panels arranged in the array, and a is the length of the lamp panel in the first direction.

6. The method according to claim 5, wherein the first brightness value calculated from the horizontal spacing and the light mixing distance is obtained by a following formula:

$$H_x = \frac{k_1 \times \Delta x}{h},$$

where Hx is the first brightness value, $k_1$ is a first brightness reference value, and h is the light mixing distance.

7. The method according to claim 1, wherein calculating the vertical spacing between the plurality of lamp panels comprises:

acquiring a length of the backlight module in the second direction, a length of a lamp panel in the second direction, and a plurality of vertical distances between lamp panels located at two ends in the second direction among the plurality of lamp panels and edges of the backlight module; and the vertical spacing is calculated according to the plurality of vertical distances, the length of the backlight module in the second direction, and the length of the lamp panel in the second direction.

8. The method according to claim 7, wherein acquiring the plurality of vertical distances between the lamp panels located at the two ends in the second direction among the plurality of lamp panels and edges of the backlight module comprises: acquiring a first vertical distance and a second vertical distance between two ends of a first column of lamp panels arranged in the array in the second direction among the plurality of lamp panels and edges of the backlight module, respectively, and acquiring a third vertical distance and a fourth vertical distance between two ends of a last column of lamp panels arranged in the array in the second direction among the plurality of lamp panels and edges of the backlight module, respectively;

the vertical spacing is calculated according to the plurality of vertical distances, the length of the backlight module in the second direction, and the length of the lamp panel in the second direction by a following formula:

$$\Delta y = \frac{1}{2}\left(\frac{Ly - (y_1 + y_2 + nb)}{n-1} + \frac{Ly - (y_3 + y_4 + nb)}{n-1}\right),$$

where Δy is the vertical spacing between the plurality of lamp panels, Ly is the length of the backlight module in the second direction, $y_1$ is the first vertical distance, $y_2$ is the second vertical distance, $y_3$ is the third vertical distance, 4 is the fourth vertical distance, n is a quantity of rows of the plurality of lamp panels arranged in the array, and b is the length of the lamp panel in the second direction.

9. The method according to claim 8, wherein the second brightness value calculated from the vertical spacing and the light mixing distance is obtained by a following formula:

$$H_y = \frac{k_2 \times \Delta y}{h},$$

where $H_y$ is the second brightness value, $k_2$ is a second brightness reference value, and h is the light mixing distance.

10. The method according to claim 7, wherein acquiring the plurality of vertical distances between the lamp panels located at the two ends in the second direction among the plurality of lamp panels and the edges of the backlight module comprises:

acquiring a plurality of first vertical distances and a plurality of second vertical distances between two ends of lamp panels arranged in the array in the second direction and edges of the backlight module, respectively, calculating an average value of the plurality of first vertical distances to obtain an average value of the first vertical distances, and calculating an average value of the plurality of second vertical distances to obtain an average value of the second vertical distances;

the vertical spacing is calculated according to the plurality of vertical distances, the length of the backlight module in the second direction, and the length of the lamp panel in the second direction by a following formula:

$$\Delta y = \frac{Ly - (\bar{y}_1 + \bar{y}_2 + nb)}{n-1},$$

among them, where Δy is the vertical spacing between the plurality of lamp panels, Ly is the length of the backlight module in the second direction, $\overline{y_1}$ is the average value of the first vertical distances, $\overline{y_2}$ is the average value of the second vertical distances, n is a quantity of rows of the plurality of lamp panels arranged in the array, and b is the length of the lamp panel in the second direction.

11. The method according to claim 10, wherein the second brightness value calculated from the vertical spacing and the light mixing distance is obtained by a following formula:

$$H_y = \frac{k_2 \times \Delta y}{h},$$

where $H_y$ is the second brightness value, $k_2$ is a second brightness reference value, and h is the light mixing distance.

12. The method according to claim 1, wherein adjusting the brightness at the splicing positions of the plurality of lamp panels according to the first brightness value comprises: adjusting brightness of adjacent lamp panels at a first splicing position in the first direction according to the first brightness value and a first preset brightness value; and adjusting the brightness at the splicing positions of the plurality of lamp panels according to the second brightness value comprises: adjusting brightness of adjacent lamp panels at a second splicing position in the second direction according to the second brightness value and a second preset brightness value.

13. The method according to claim 1, wherein adjusting the brightness at the splicing positions of the plurality of lamp panels according to the first brightness value and the second brightness value comprises:

calculating a third brightness value according to the first brightness value and the second brightness value; and adjusting brightness of the plurality of lamp panels at a third splicing position according to the third brightness value.

14. The method according to claim 13, wherein calculating the third brightness value according to the first brightness value and the second brightness value comprises:

calculating an average value of the first brightness value and the second brightness value to obtain the third brightness value; and adjusting the brightness of the plurality of lamp panels at the third splicing position according to the third brightness value comprises: adjusting brightness of the plurality of lamp panels at the third splicing position according to the third brightness value and a third preset brightness value.

15. A non-transitory computer-readable storage medium, wherein the non-transitory computer-readable storage medium is configured to store computer program instructions, and when the computer program instructions are executed, the method for adjusting backlight brightness according to claim 1 may be implemented.

16. A system for adjusting backlight brightness, wherein the system is configured to adjust brightness at splicing positions of lamp panels in a backlight module, the backlight module comprises a plurality of lamp panels arranged in an array, and the plurality of lamp panels arranged in the array are disposed on the backlight module in a splicing manner, and the system comprises:

a distance calculation module configured to calculate a light mixing distance and a horizontal distance and a vertical distance between the plurality of lamp panels;

a brightness value calculation module configured to calculate a first brightness value according to the horizontal spacing and the light mixing distance and calculate a second brightness value according to the vertical spacing and the light mixing distance; and an adjustment module configured to adjust brightness at the splicing positions of a plurality of lamp panels according to at least one of the first brightness value and the second brightness value, wherein the backlight module further comprises a light guide plate, and calculating the light mixing distance of the backlight module comprises:

acquiring a plurality of light mixing distances between the plurality of lamp panels and the light guide plate; and calculating an average value of the plurality of light mixing distances to obtain the light mixing distance, wherein acquiring the plurality of light mixing distances between the plurality of lamp panels and the light guide plate comprises: acquiring a first light mixing distance and a second light mixing distance between lamp panels located at two ends of the backlight module in a first direction or a second direction and the light guide plate; and the light mixing distance is obtained by calculating the average value of the plurality of light mixing distances, and is calculated by a following formula:

$$h = \frac{1}{2}(h_1 + h_2),$$

where h is the light mixing distance, $h_1$ is the first light mixing distance, and $h_2$ is the second light mixing distance.

17. A device for adjusting backlight brightness, wherein the device is configured to adjust brightness at splicing positions of lamp panels in a backlight module, the backlight module comprises a plurality of lamp panels arranged in an array, and the plurality of lamp panels arranged in the array are disposed on the backlight module in a splicing manner, the device comprises a memory, a processor, and a computer program stored in the memory and executable on the processor to execute:

calculating a light mixing distance and a horizontal spacing and a vertical spacing between the plurality of lamp panels;

calculating a first brightness value according to the horizontal spacing and the light mixing distance, and calculating a second brightness value according to the vertical spacing and the light mixing distance; and adjusting brightness at the splicing positions of the plurality of lamp panels according to at least one of the first brightness value and the second brightness value, wherein the backlight module further comprises a light guide plate, and calculating the light mixing distance of the backlight module comprises:

acquiring a plurality of light mixing distances between the plurality of lamp panels and the light guide plate; and calculating an average value of the plurality of light mixing distances to obtain the light mixing distance, wherein acquiring the plurality of light mixing distances between the plurality of lamp panels and the light guide plate comprises: acquiring a first light mixing distance and a second light mixing distance between lamp panels located at two ends of the backlight module in a first direction or a second direction and the light guide plate; and the light mixing distance is obtained by calculating the average value of the plurality of light mixing distances, and is calculated by a following formula:

$$h = \frac{1}{2}(h_1 + h_2),$$

where h is the light mixing distance, $h_1$ is the first light mixing distance, and $h_2$ is the second light mixing distance.

* * * * *